(12) United States Patent
Mendel et al.

(10) Patent No.: US 9,197,531 B1
(45) Date of Patent: *Nov. 24, 2015

(54) METHODS AND APPARATUS OF TIME STAMPING FOR MULTI-LANE PROTOCOLS

(71) Applicant: ALTERA CORPORATION, San Jose, CA (US)

(72) Inventors: David W. Mendel, Sunnyvale, CA (US); Herman Schmit, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 13/764,614

(22) Filed: Feb. 11, 2013

Related U.S. Application Data

(60) Provisional application No. 61/644,928, filed on May 9, 2012.

(51) Int. Cl.
*H04W 24/00* (2009.01)
*H04L 12/26* (2006.01)

(52) U.S. Cl.
CPC .................................. *H04L 43/106* (2013.01)

(58) Field of Classification Search
None
See application file for complete search history.

(56) References Cited

U.S. PATENT DOCUMENTS

| | | | | |
|---|---|---|---|---|
| 4,803,566 | A * | 2/1989 | Berlekamp et al. | 360/26 |
| 2001/0047439 | A1* | 11/2001 | Daniel et al. | 710/52 |
| 2003/0031172 | A1* | 2/2003 | Grinfeld | 370/389 |
| 2003/0200548 | A1* | 10/2003 | Baran et al. | 725/90 |
| 2005/0069039 | A1* | 3/2005 | Crinon | 375/240.26 |
| 2005/0286565 | A1* | 12/2005 | Vakil et al. | 370/503 |
| 2006/0126713 | A1* | 6/2006 | Chou et al. | 375/225 |
| 2007/0297552 | A1* | 12/2007 | Bae et al. | 375/371 |
| 2008/0155087 | A1* | 6/2008 | Blouin et al. | 709/223 |
| 2008/0239974 | A1* | 10/2008 | Chew et al. | 370/252 |
| 2009/0252050 | A1* | 10/2009 | Jiang | 370/252 |
| 2009/0310726 | A1* | 12/2009 | Alankry et al. | 375/359 |
| 2010/0085989 | A1* | 4/2010 | Belhadj et al. | 370/503 |
| 2011/0235459 | A1* | 9/2011 | Ware et al. | 365/233.11 |
| 2012/0155497 | A1* | 6/2012 | Lee et al. | 370/507 |
| 2013/0170507 | A1* | 7/2013 | Hsueh et al. | 370/503 |

OTHER PUBLICATIONS

IEEE Standard for a Precision Clock Synchronization Protocol for Networked Measurement and Control Systems, Jul. 24, 2008, 289 pgs., IEEE Std 1588-2008 (Revision of IEEE Std 1588-2002).
IEEE Media Access Control Parameters, Physical Layers, and Management Parameters for 40 Gb/s and 100 Gb/s Operation, Jun. 22, 2010, 427 pgs., IEEE Std 802.3ba-2010 (Amendment to IEEE Std 802.3-2008).

(Continued)

*Primary Examiner* — Hassan Phillips
*Assistant Examiner* — Guatam Sharma
(74) *Attorney, Agent, or Firm* — Okamoto & Benedicto LLP

(57) ABSTRACT

One embodiment relates to a method of determining an arrival time of a data packet which has data striped across a plurality of lanes of a multi-lane link. Word arrival times for a subset of the words of the data packet are determined, each word arrival time corresponding to an arrival time of a word of the data packet at an individual lane of the multi-lane link. The arrival time of the data packet is determined using the word arrival times for the subset of words. Another embodiment relates to a method of determining an arrival time of a data packet which uses a measure of average fullness for a set of the FIFO buffers. Other embodiments and features are also disclosed.

18 Claims, 17 Drawing Sheets

(56) References Cited

OTHER PUBLICATIONS

M Gustlin, P. Anslow, and D Giannakopoulos, 100GE/40GE skew budget, Nov. 2008, 21 pgs., IEEE 802.3ba TF.
Gary Nicholl, 100GE and 40GE PCS Overview, Nov. 2008, 27 pgs., IEEE 802.3az Energy Efficient Ethernet Task Force public area.
Pedro Moreira, et al. "White Rabbit: Sub-Nanosecond Timing Distribution over Ethernet", Oct. 12-16, 2009, pp. 58-62, ISPCS 2009 International IEEE Symposium on Precision Clock Syncronization for Measurement, Control and Communication, Brescia, Italy.
Altera—CPRI MegaCore Function User Guide, Jun. 2012, 11 pages, Altera Corporation, San Jose, CA.

* cited by examiner

| Skew Point | Budget max Skew | Expected max Skew | Fixed Skew | Random Skew |
|---|---|---|---|---|
| SP1 | 29 ns | 3 ns | 1 ns | 2 ns |
| SP2 | 14 ns | 13 ns | 0.2 ns | 12.8 ns |
| SP3 | 1 ns | 1 ns | 1 ns | 0 ns |
| SP4 | 100 ns | 13.6 ns | 0 ns | 13.6 ns |
| SP5 | 2 ns | 1 ns | 0 ns | 1 ns |
| SP6 | 14 ns | 13 ns | 0.2 ns | 12.8 ns |
| Total | 160 ns | 44.6 ns | 2.4 ns | 42.2 ns |

| Packet | Clock cycle | Virtual Lane | Δ Time |
|---|---|---|---|
| 0 | n | 0 | |
| 1 | n+3 | 1 | 3 clocks |
| 2 | n+6 | 2 | 3 clocks |
| 3 | n+9 | 3 | 3 clocks |
| 4 | n+13 | 0 | 4 clocks |
| 5 | n+16 | 1 | 3 clocks |

FIG. 5

| VLs averaged | Error Percentile | | | |
| --- | --- | --- | --- | --- |
| | *50th* | *90th* | *95th* | *99th* |
| 1 | 4.7 | 11.1 | 13.0 | 15.9 |
| 2 | 3.2 | 7.6 | 9.0 | 11.5 |
| 5 | 1.8 | 4.4 | 5.2 | 6.7 |
| 10 | 1.0 | 2.5 | 3.0 | 3.9 |
| 20 | 0.0 | 0.0 | 0.0 | 0.0 |

METHODS AND APPARATUS OF TIME STAMPING FOR MULTI-LANE PROTOCOLS

CROSS-REFERENCE TO RELATED APPLICATION(S)

The present application claims the benefit of U.S. Provisional Patent Application No. 61/644,928, filed May 9, 2012 by David W. Mendel and Herman Schmit. The disclosure of U.S. Provisional Patent Application No. 61/644,928 is hereby incorporated by reference in its entirety.

TECHNICAL FIELD

The present invention relates generally to the transfer of data in data processing systems. More particularly, the present invention relates to the transfer of data across multi-lane communication links.

DESCRIPTION OF THE BACKGROUND ART

An example of a conventional time-stamping protocol is given by the IEEE 1588-2008 standard. IEEE 1588-2008 defines the time at which a packet leaves or arrives as the instant the first bit of the start of packet (SOP) leaves or arrives at the input/output pin. This definition is useful, for example, when data is either carried on a single pin pair, as in the Serial Gigabit Media Independent Interface (SGMII), or over a bus where the bus arrives synchronously and the SOP is indicated by bit[0] of the bus, as in the Gigabit Media Independent Interface (GMII).

SUMMARY

One embodiment relates to a method of determining an arrival time of a data packet which has data striped across a plurality of lanes of a multi-lane link. Word arrival times for the words of the data packet are determined, each word arrival time corresponding to an arrival time of a word of the data packet at an individual lane of the multi-lane link. The arrival time of the data packet is determined using a predetermined function of the word arrival times.

Another embodiment relates to a receiver circuit that determines an arrival time of a data packet which has data striped across a plurality of lanes of a multi-lane link. A plurality of receiver channel circuits is configured to receive words of the data packet on the plurality of lanes of the multi-lane link. A receiver controller includes arrival detector circuits coupled to the receiver channel circuits for determining word arrival times for the words of the data packet, each word arrival time corresponding to an arrival time of a word of the data packet at an individual lane of the multi-lane link. The receiver controller further includes logic circuitry coupled to the arrival detector circuits for determining the arrival time of the data packet using a predetermined function of the word arrival times.

Other embodiments and features are also disclosed herein. For example, one embodiment relates to a method of determining an arrival time of a data packet which uses the word arrival times for a subset of the words of the data packet. Another embodiment relates to a receiver circuit that determines an arrival time of a data packet using the word arrival times for a subset of the words of the data packet. Another embodiment relates to a method of determining an arrival time of a data packet which uses a measure of average fullness for a set of the FIFO buffers. Another embodiment relates to a receiver circuit that determines an arrival time of a data packet using a measure of average fullness for a set of the FIFO buffers.

BRIEF DESCRIPTION OF THE DRAWINGS

FIG. 1D provides a table showing an analysis of lane-to-lane skew in an exemplary multi-lane link.

FIG. 5 provides a table showing an analysis of precision timing protocol (PTP) packet arrivals in accordance with an embodiment of the invention.

FIG. 7 provides a table showing simulation results for a multi-lane link in accordance with embodiments of the invention.

DETAILED DESCRIPTION

Introduction

Figure 1A:
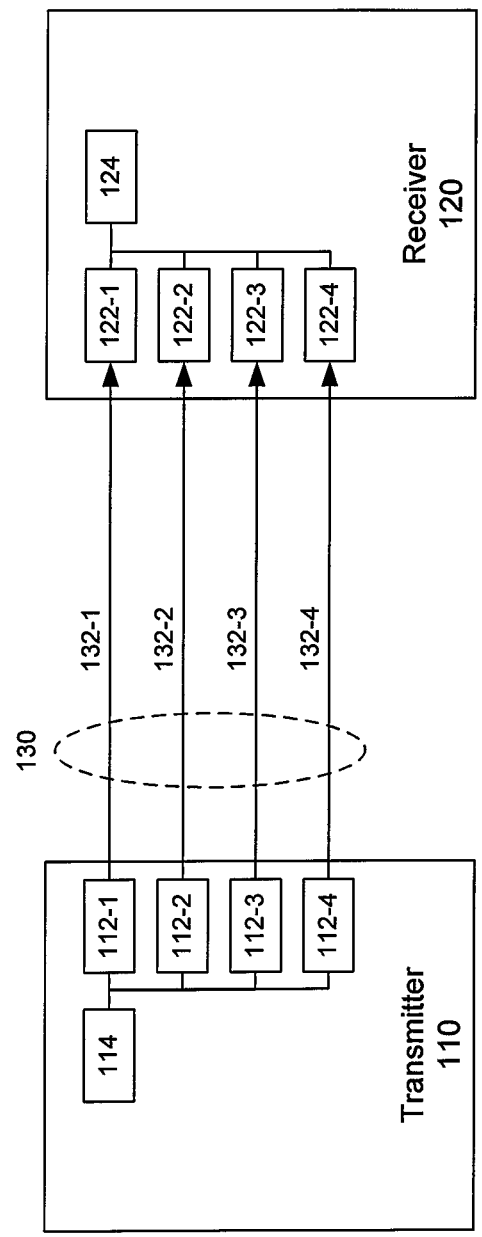
FIG. 1A depicts an exemplary one-way multi-lane point-to-point link in accordance with one embodiment of the present invention.

The present application discloses the following problem or issue with conventional time-stamping protocols, such as IEEE-1588-2008, for example. Conventional time-stamping assumes a well-defined instant at which the beginning of a packet crosses the reference plane between the precision time protocol (PTP) node and the network. However, this definition is unclear and insufficient in the case of a multi-lane link.

Consider, for example, the 40 Gigabit Ethernet (40 GE) or 100 Gigabit Ethernet (100 GE) standards. A multi-lane link according to these standards stripes data across multiple serial lanes of 40 gigabits per second (40 Gbps) and 100 Gbps, respectively. The arrival of data on each of these lanes will have skew relative to the others. This implies that the arrival time on each lane is not simultaneous with the arrival times on the other lanes. Furthermore, there is an implied time-ordering between the lanes of a multi-lane link that is not captured in the existing time-stamp definitions.

The present application presents solutions to problems and issues with time-stamping in relation to multi-lane links. Methods and apparatus for advantageously determining packet arrival times in the case of a multi-lane link are disclosed.

DEFINITIONS

The following are definitions for certain terms used in this patent application.

A word (or data word) is a logical unit of data for a given protocol. For example, in 8b/10b encoding schemes, the transmitted word is 10-bits in length. For 64b/66b encoding schemes (as used in 10 Gigabit Ethernet, for example), the natural word size is 64 bits of data plus one bit of information indicating that the word is either control or data information. Other protocols may have other word sizes.

A data packet carries data for normal information transfer. A data packet may be one or more words in length. Words of a data packet may be referred to as data words.

A multi-lane link is a point-to-point link which includes multiple serial lanes. A lane may be unidirectional or bidirectional. A given protocol may stripe data across multiple lanes.

Striping is a process for taking successive words (either data or control) and putting them on one lane, then another, and so on. For example, given a four-lane link, normal striping may distribute a packet made up of seven words as follows: word 1 to lane 1; word 2 to lane 2; word 3 to lane 3; word 4 to lane 4; word 5 to lane 1; word 6 to lane 2; and word 7 to lane 3. If a second packet is sent, its word 1 would start at the next available lane, which is lane 4 in this example.

Multi-Lane Links

FIG. 1A depicts an exemplary multi-lane point-to-point link 130 in accordance with an embodiment of the invention. As shown, the link 130 goes from a transmitter 110 which may be on a first integrated circuit to a receiver 120 which may be on a second integrated circuit. As further shown, the link 130 may comprise multiple lanes, in this example, four lanes (132-1, 132-2, 132-3, and 132-4). Of course, other numbers of lanes may be implemented and showing a four lane structure is merely exemplary and not intended to limit the scope of the present invention. Operations at the transmitter 110 may be controlled by a transmitter controller 114, and operations at the receiver 120 may be controlled by a receiver controller 124.

Serial data may be multiplexed at the transmitter 110 to create multiple serial data streams, one for each lane 132. There may be a first transmission queue 112-1 for the serial data to be transmitted on the first lane 132-1, a second transmission queue 112-2 for the serial data to be transmitted on the second lane 132-2, a third transmission queue 112-3 for the serial data to be transmitted on the third lane 132-3, and a fourth transmission queue 112-4 for the serial data to be transmitted on the fourth lane 132-4. Each queue 112 may be implemented as a first-in-first-out (FIFO) queue, for example.

At the receiver 120, there may be a first FIFO buffer 122-1 for the serial data that is received on the first lane 132-1, a second FIFO buffer 122-2 for the serial data that is received on the second lane 132-2, a third FIFO buffer 122-3 for the serial data that is received on the third lane 132-3, and a fourth FIFO buffer 122-4 for the serial data that is received on the fourth lane 132-4. Each FIFO buffer 122 may be implemented as a FIFO buffer with an individually controllable delay. The receiver 120 may be configured to control the delay for each of the FIFO buffers 122 so as to deskew the serial data streams received on the multiple lanes such that the received data is aligned across the lanes. The receiver 120 may also be configured to de-multiplex the aligned data from the multiple lanes to recreate the original serial data.

Figure 1B:
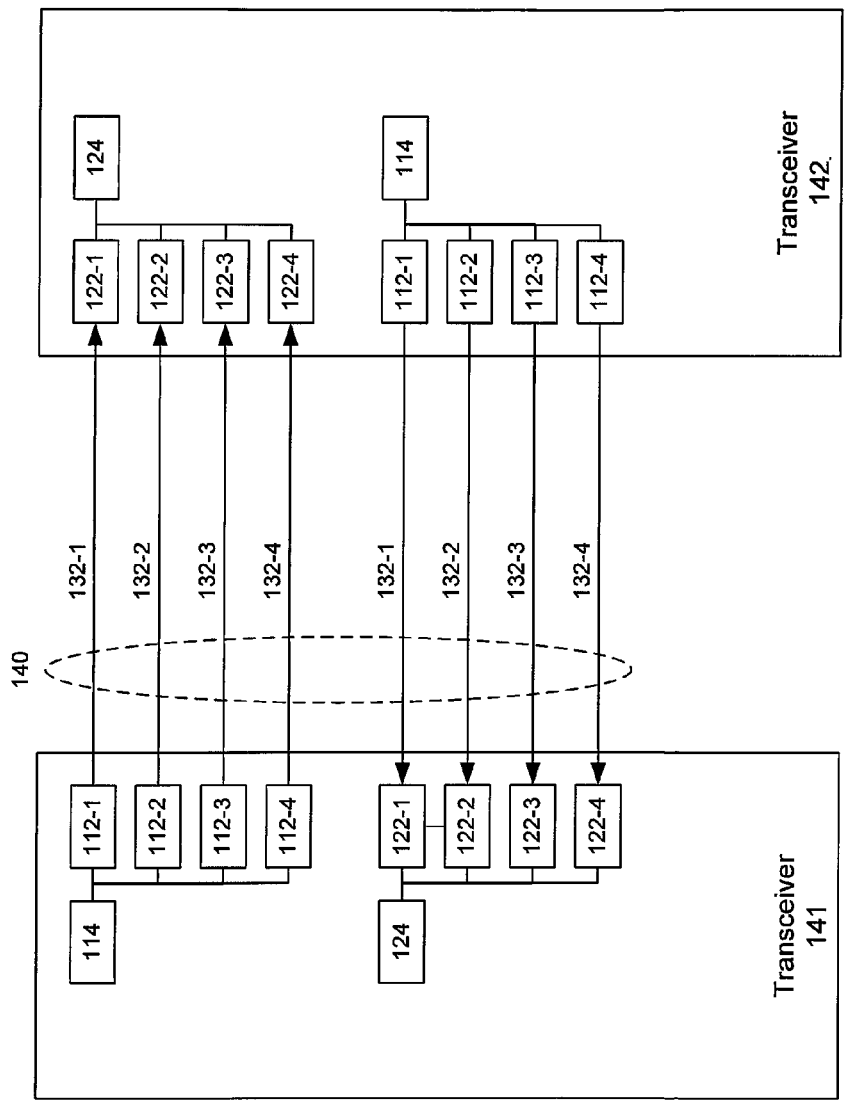
FIG. 1B depicts an exemplary bi-directional multi-lane point-to-point link in accordance with one embodiment of the present invention.

While FIG. 1A shows a one-way link between a transmitter and a receiver, a multi-lane point-to-point link may also be bi-directional between two transceivers. An example of such a bi-directional multi-lane point-to-point link 140 is illustrated in FIG. 1B. As shown, the two-way link 140 is between a first transceiver 141 which may be on a first integrated circuit and a second transceiver 142 which may be on a second integrated circuit.

As further shown, the link 140 may comprise multiple lanes, in this example, four lanes (132-1, 132-2, 132-3, and 132-4) in each direction. Of course, other numbers of lanes may be implemented, and the number of lanes in each direction need not be the same. Accordingly, the number of lanes used here is merely exemplary and not intended to limit the scope of the present invention. Transmission operations at the transceiver (141 and 142) may be controlled by a transmitter controller 114, and reception operations at the each transceiver (141 and 142) may be controlled by a receiver controller 124.

Skew in a Multi-Lane Link

Figure 1C:
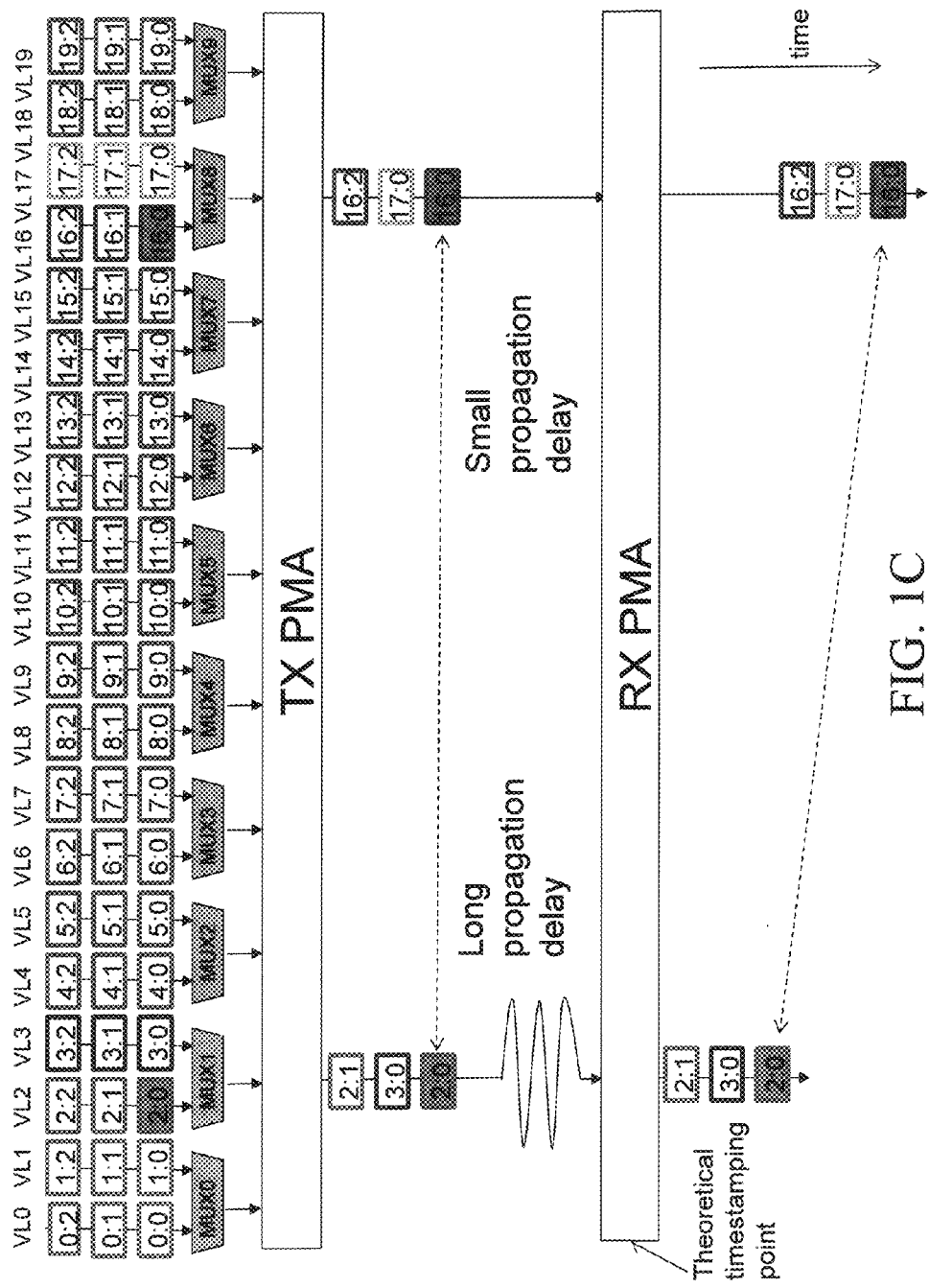
FIG. 1C is a schematic diagram depicting the presence of skew in a multi-lane link.

FIG. 1C is a schematic diagram depicting the presence of skew in a multi-lane link. In the example depicted in FIG. 1C, there are twenty virtual lanes, numbered 0 through 19 (VL0 through VL19). Data streams from pairs of adjacent virtual lanes are multiplexed together by the 2:1 MUX circuits (MUX0 through MUX9) and transmitted on ten corresponding physical lanes from the transmitter physical media attachment (TX PMA) circuitry on the transmitting IC to receiver physical media attachment (RX PMA) circuitry on the receiving IC.

In this figure, the first three words transmitted on virtual lane n is denoted n:0, n:1, and n:2 (i.e. the first three words transmitted on VL0 are labeled 0:0, 0:1, and 0:2; the first three words transmitted on VL1 are labeled 1:0, 1:1, and 1:2; the first three words transmitted on VL2 are labeled 2:0, 2:1, and 2:2; and so on).

Consider two packets, a first packet with the start-of-packet (SOP) at word 2:0, and the second packet with the SOP at word 16:0. Consider that SOP 2:0 and SOP 16:0 are transmitted at a same clock cycle from TM PMA. SOP 2:0 is transmitted on the second physical lane corresponding to MUX1, and SOP 16:0 is transmitted on the ninth physical lane corresponding to MUX8. Below the TX PMA circuitry, only these two of the total ten physical lanes are depicted for clarity and ease of illustration.

In the illustrated example, consider that the second physical lane (corresponding to MUX1) has a longer propagation delay than the ninth physical lane (corresponding to MUX8). In this case, although SOP 2:0 and SOP 16:0 are transmitted at the same time from TX PMA, the SOP 16:0 arrives much earlier than SOP 2:0 at the RX PMA. This difference in arrival time is depicted in FIG. 1C. For example, SOP 16:0 may arrive several clock cycles before SOP 2:0. Despite that, the first packet (starting at SOP 2:0) may be fully received prior to the second packet (starting at SOP 16:0). Hence, if the packet timestamp is based solely on the arrival time of the SOP (as currently defined in the IEEE 1588-2008 specification), then the sequentially later packet (starting at word 16:0 which is fully received later) may be given an earlier timestamp than a preceding packet (starting at word 2:0 which is fully received earlier). Such a result may be problematic in some instances.

FIG. 1D is a table showing an analysis of lane-to-lane skew in an exemplary multi-lane link. The exemplary multi-lane links a 40 GE or 100 GE link defined under the IEEE 802.3ba standard.

The table shows six skew points denoted as SP1 through SP6 which may be sources of lane-to-lane skew. For each skew point, a budget maximum skew is shown. The budget maximum skew is the incremental skew budget for that skew point.

The first skew point (SP1) refers to the skew contribution of the Physical Coding Sublayer (PCS) layer and its attached Physical Media Attachment Sublayer (PMA) at the TX interface. Unaligned serializer/deserializer FIFOs and PMA start-up conditions cause this skew. The budget maximum skew for SP1 is 29 ns.

The second skew point (SP2) refers to the skew contribution of the PMA. The budget maximum skew for SP2 is 14 ns. This skew is caused by the difference if FIFO levels, the serializer/deserializer circuitry, and difference in trace lengths.

The third skew point (SP3) refers to the skew contribution of the physical media interface. The budget maximum skew for SP3 is less than 1 ns.

The fourth skew point (SP4) refers to the contribution due to the skew within the physical media itself, which is typically the fiber optics. The budget maximum skew for SP4 is 100 ns.

The fifth skew point (SP5) refers to the contribution of the interface between the physical media and the receiver side PMA. This skew includes the skew due to physical media RX interface and due to the physical connection. The budget maximum skew of SP5 is 2 ns.

The sixth skew point (SP6) is analogous to SP2, but at the receive end. SP6 has the same budget maximum skew as SP2 of 14 ns.

The total budget maximum skew of the six skew points is 160 ns. Note that this ignores a 20 ns incremental budget due to possible PMA and PCS skew within the receiving device. This last contribution is ignored for our purposes because it occurs after the signal arrives at the device pins.

Also shown in the table of FIG. 1D is the expected maximum skew for each skew point. The expected maximum skew is the worst-case skew that we actually expect according to our own analysis of exemplary interface circuitry. Note that the expected maximum skew totals to 44.6 ns, which is substantially less than the budget max skew. It is expected that the typical skew observed will be much less than the expected maximum skew.

The expected maximum skew may be divided into a fixed skew and a random skew. The fixed skew is the portion that remains constant across resets, while the random skew is the portion that may change reset-by-reset. As shown, most of the expected maximum skew is due to random skew which changes on a reset-by-reset basis.

Improved Time-Stamping for a Multi-Lane Link with Skew

Our analysis discussed above causes us to believe that a given skew point's contribution is likely to be uniformly distributed across virtual lanes. In addition, our analysis indicates that the total skew may be considered as the sum of independent variables. In other words, the contribution of a particular skew point to a particular virtual lane may be considered to be uncorrelated with the contribution from other skew points.

Based on these conclusions of ours, this section discloses an improved technique for determining an arrival time for time-stamping a packet arriving on a multi-lane link. This technique advantageously avoids the problematic case where a sequentially later packet may be given an earlier timestamp than a preceding packet.

Figure 2:
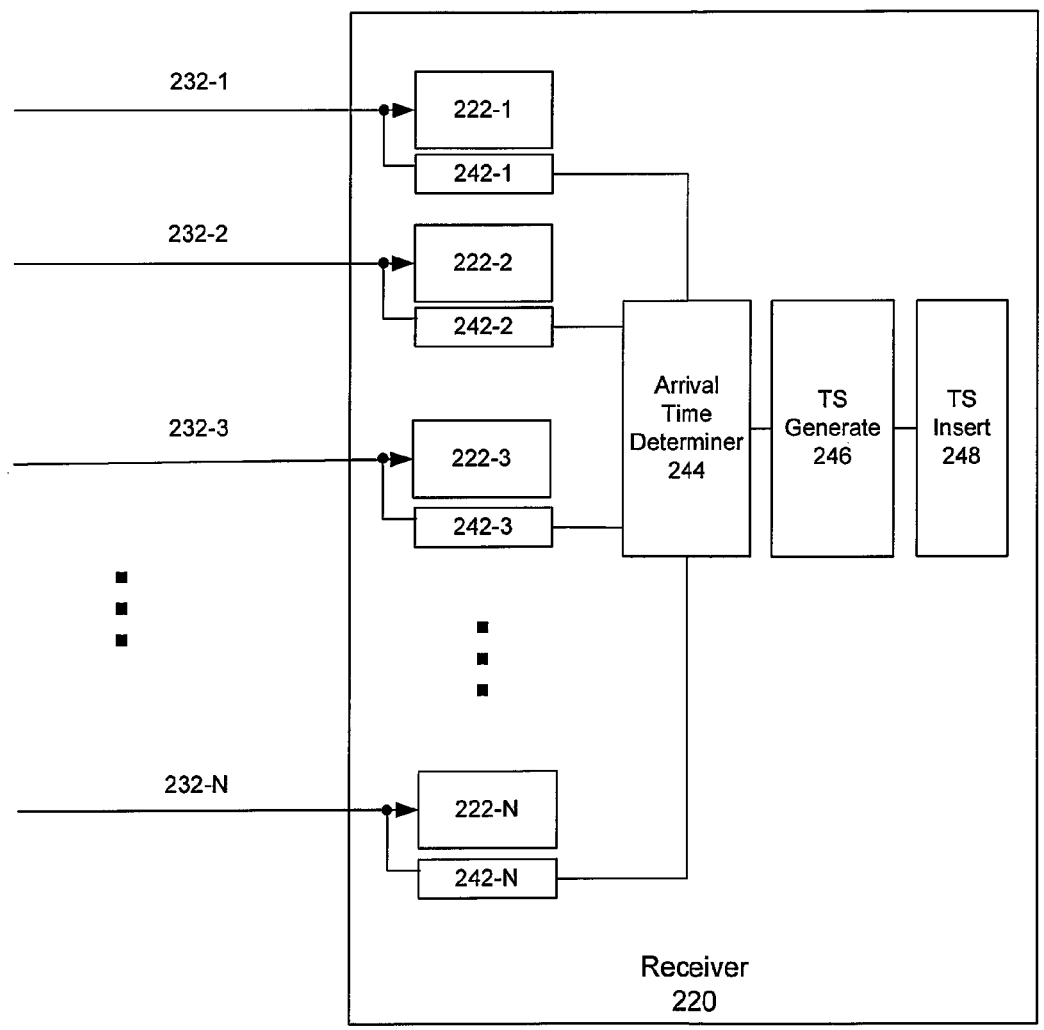
FIG. 2 is a block diagram of an exemplary circuit apparatus for determining an arrival time of a data packet received on a multi-lane link in accordance with an embodiment of the invention.

FIG. 2 is a block diagram of circuit apparatus in a receiver 220 for determining an arrival time of a data packet received on a multi-lane link in accordance with an embodiment of the invention. As shown, the receiver 220 may include N serial communication channels which are configured to provide N physical lanes 232-1 through 232-N of an N-lane link. N may be two or more. In one example, N may be four. In another example, N may be ten. Other numbers of physical lanes may be utilized in other cases.

Words are received on these N lanes by the N FIFO buffers 222-1 through 222-N. In this exemplary apparatus, the communication protocol is such that there are N virtual lanes. Thus, in this example, the number of physical lanes is the same as the number of virtual lanes.

As further shown, the receiver 220 may include N word arrival time detector circuits 242-1 through 242-N. Each word arrival time detector circuit 242-*n* may be connected at an entry point of a corresponding FIFO buffer 222-*n*, where n is a number from 1 to N.

The receiver 220 may further include an arrival time determiner circuit 244. The arrival time determiner circuit 244 may be electrically coupled to the lane arrival detector circuits 242-1 through 242-N. The arrival time determiner circuit 244 may be arranged or configured to determine an arrival time for a data packet received over the N-lane link (the packet arrival time).

The receiver 220 may further include a time-stamp (TS) generator circuit 246 for generating a receive timestamp using the packet arrival time. The TS generator circuit 246 may generate the receive timestamp using other information besides the packet arrival time. For example, additional latencies may be used to adjust the time.

Finally, a TS insertion circuit 248 may be used to insert the receive time-stamp into the data packet. The format of the receive timestamp may conform to a timestamping standard, such as IEEE 1588, for example.

Figure 3:
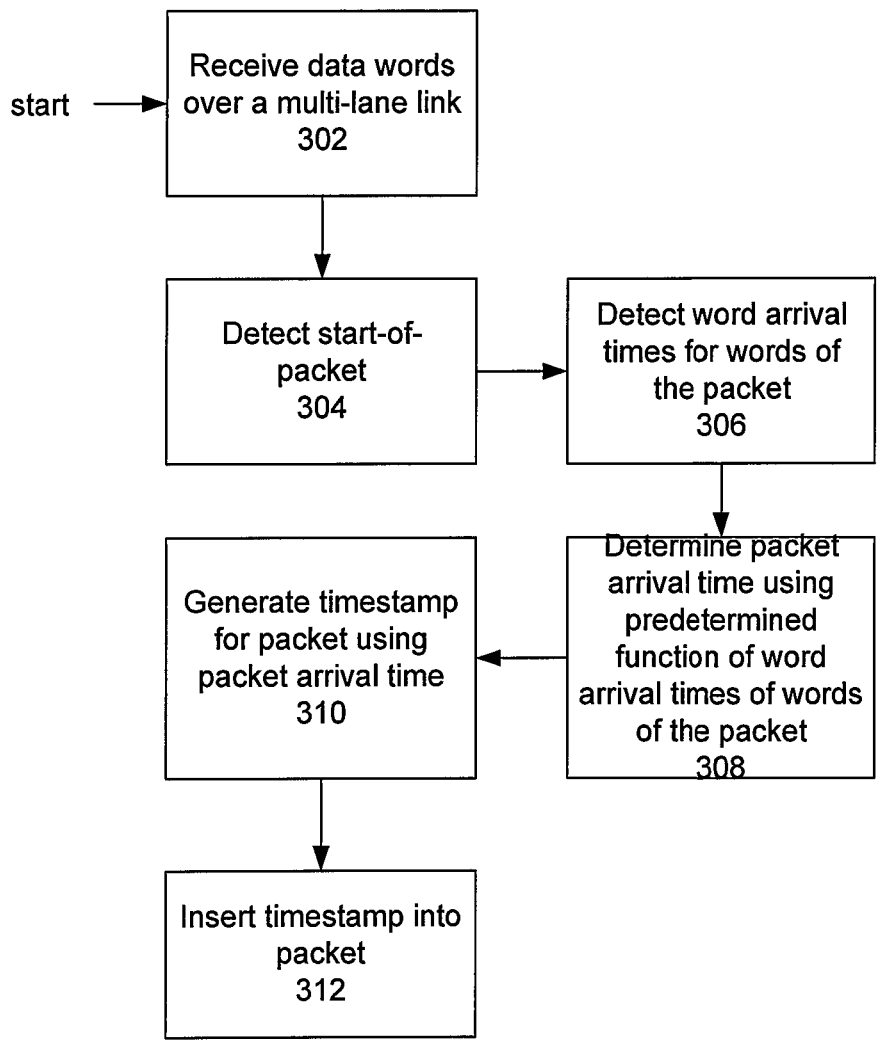
FIG. 3 is a flow chart of an exemplary method of time-stamping a data packet using a predetermined function of word arrival times in accordance with an embodiment of the invention.

FIG. 3 is a flow chart of an exemplary method 300 of time-stamping a data packet using a predetermined function of word arrival times in accordance with an embodiment of the invention. Contents of the data packet may be striped across one or more serial lanes of the multi-lane link between a transmitting IC and a receiving IC. Thus, words of the data packet may be transmitted on more than one of the serial lanes of the link.

Per block 302, words are received on lanes of the multi-lane link by the receiving IC. Words that are sent simultaneously by the transmitting IC may be received at different times by the receiving IC due to skew. Also, words that are sent simultaneously by the transmitting IC may not necessarily belong to the same data packet.

Per block 304, a start of packet (SOP) symbol or delimiter may be detected in the words received. In other words, a word received on a lane may be determined to be an SOP delimiter. The SOP delimiter indicates the beginning of a data packet.

Per block 306, word arrival times are obtained for the words of the data packet. Each word arrival time corresponds to an arrival time of a word of the data packet at a single physical lane. Hence, the word arrival times may also be referred to as lane arrival times.

Per block 308, the arrival time of the data packet (packet arrival time) is computed as a predetermined function of the word arrival times. In one embodiment, the predetermined function may be an average of the word arrival times. In another embodiment, the average word arrival time may be adjusted depending on the lane that the start-of-packet word for the packet is received upon. In another embodiment, the predetermined function may obtain a median value of the word arrival times.

Per block 310, a receive timestamp may be generated using the packet arrival time. Other information, such as additional latencies, may be used in addition to the packet arrival time to generate the receive time-stamp. For example, additional latencies may be used to adjust the time.

Finally, per block 312, the receive timestamp may be inserted into the data packet. The format of the receive timestamp may conform to a timestamping standard, such as IEEE 1588, for example.

Figure 4:
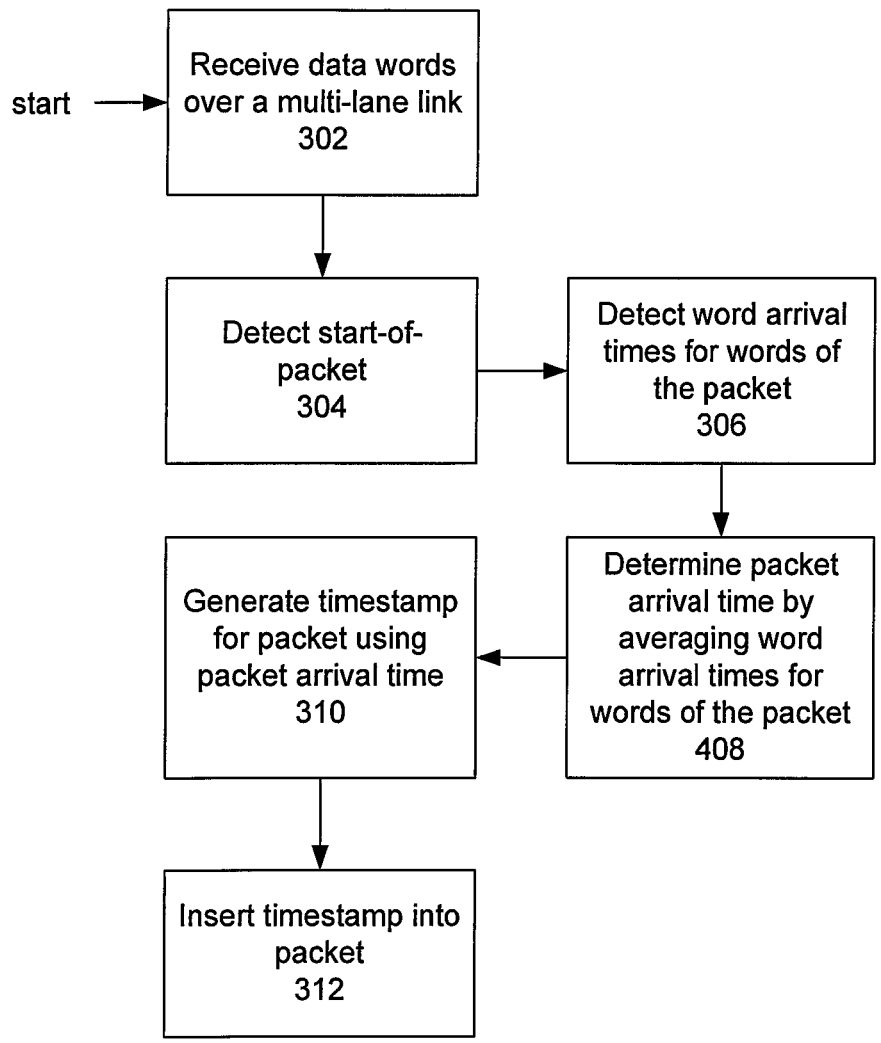
FIG. 4 is a flow chart of an exemplary method of time-stamping a data packet by averaging word arrival times for words of the packet in accordance with an embodiment of the invention.

FIG. 4 is a flow chart of an exemplary method 400 of time-stamping a data packet by averaging word arrival times for all words of the packet in accordance with an embodiment of the invention. The method 400 of FIG. 4 is similar to the method 300 of FIG. 3. However, the method 400 of FIG. 4 specifies in block 408 that the packet arrival time is computed by averaging word arrival times for words of the packet.

Simultaneous Arrival of Multiple Data Words

Now consider multiple words arriving in parallel independent of skew (i.e. without skew between lanes). In 100 GE, each virtual lane carries 8 bytes (or octants as used in IEEE 802.3) of data. Twenty virtual lanes deliver 160 bytes of data, enough for up to two full packets and the beginning of a third. Thus, the PCS layer can see three simultaneous packets, while the media access controller (MAC) sees a definitive ordering.

As currently defined, two back-to-back PTP packets transmitted on parallel virtual lanes, receive identical time-stamps. For example, if the PTP packets were 80 bytes long and there was a 24-byte space between packets, the packets would arrive exactly 13 virtual lanes apart. One could appear on VL0 and the other could start on VL13, in which case they would have identical timestamps.

If, however, they were delayed so that the first appeared on VL10, the next would appear a clock cycle later on VL3, and they would have different timestamps.

40 GE presents a more subtle version of this problem. This protocol only receives 32 bytes of information simultaneously; consequently, it cannot have simultaneous packets. Suppose that the same 80 byte PTP packets are sent with the same 24 byte space between packets, and that the first PTP packet arrives on clock cycle n, VL0. The PTP packets will arrive as shown in the table provided in FIG. 5. As shown by packet 4 arriving 4 clock cycles after packet 3 (while the other packets arrive 3 clock cycles after the preceding packet), the time differences between these "equally spaced" PTP packets are not equal. While acknowledging that back-to-back PTP packets will not occur in practice, the example illustrates the difficulty with the existing definition.

Pro-Rated Arrival Times for Simultaneous Arrival

Consider, for example, a 100 GE link. Ignoring skew, the time arrival of the data on the 100 GE link may be simultaneous on the twenty virtual lanes (VL0 through VL19). In contrast, the logical arrival of the data for 100 GE is VL0, followed by VL1 on through VL19.

This section discloses a technique where the logical arrival order for the virtual lanes from the viewpoint of the MAC layer is extended to the determination of arrival times for the words on the virtual lanes. Specifically, the arrival times may be pro-rated based on the lane number of the virtual lane.

For example, define T as the time it takes to receive one word of data on a virtual lane of a link with N virtual lanes. Using this technique, the arrival time for a word on VL1 may be set to be $1/N^{th}$ of time T after the arrival time for the preceding word on VL0, and the arrival time for a word on VL2 may be set to be $2/N^{ths}$ of time T after the arrival time for the preceding word on VL0, etc. For example, N may be 20. In that case, the arrival time for a word on VL1 may be set to be $1/20^{th}$ of time T after the arrival time for the preceding word on VL0, and the arrival time for a word on VL2 may be set to be $2/20^{ths}$ of time T after the arrival time for the preceding word on VL0, etc.

Advantageously, this technique fully resolves both the problem of two packets arriving in the same clock tick (for example, under 100 GE) and also the apparent time jitter explained above in relation to FIG. 5. With this technique, packets that are evenly spaced will have evenly spaced timestamps. Note that this technique is compatible with future implementations where there is a single high-speed electrical link to carry all 20 virtual lanes that transmits words from each virtual lane in a round-robin order.

Figure 6:
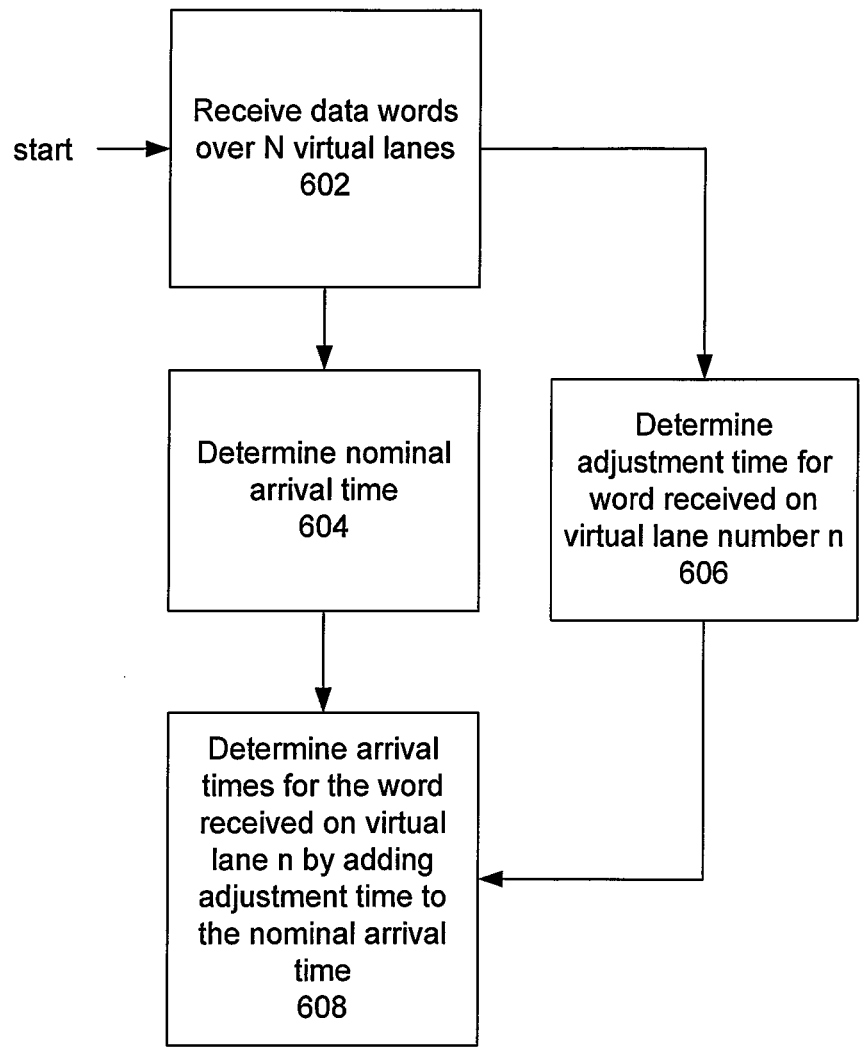
FIG. 6 is a flow chart of an exemplary method of determining an arrival time of a word on a virtual lane in accordance with an embodiment of the invention.

FIG. 6 is a flow chart of an exemplary method 600 of determining an arrival time of a word arriving on a virtual lane in accordance with an embodiment of the invention. This method 600 may be advantageously applied, for example, to multi-lane links where the start of packet may arrive at any virtual lane of the link.

Consider a link with a set number N of virtual lanes. The N virtual lanes may be numbered 1 to N going from the first virtual lane to the last virtual lane.

Per block 602, words are received on the N virtual lanes of the multi-lane link by the receiving IC. Words that are sent simultaneously by the transmitting IC may be received at different times by the receiving IC due to skew. Also, words that are sent simultaneously by the transmitting IC may not necessarily belong to the same data packet.

Per block 604, a nominal word arrival time may be determined. In one example, the nominal word arrival time may be determined by averaging the arrival times for the N words on the N virtual lanes. In another example, the nominal word arrival time may be determined by determining a midpoint between the arrival time of the word on the first virtual lane and the arrival time of the word on the last virtual lane. In another example, the nominal word arrival time may be determined by determining a median arrival time for the N words.

Per block 606, an adjustment time may be determined. The adjustment time may depend on the number of the virtual lane on which the start of packet for the data packet arrives. For example, if the number of the virtual lane is n (where n is a number from 1 to N), then the adjustment time may be a pro-rated word reception period that is equal to n multiplied by T divided by N, where T is the time per word to arrive (i.e. the time period for one word to arrive on a lane). In this case, the adjustment time is a time proportional pro-ration of a single word reception period.

Finally, per block 608, the arrival time may be determined for the word arriving on virtual lane n. In a particular implementation, the arrival time may be determined to be the nominal arrival time plus the adjustment time.

Combined Technique

In accordance with another embodiment of the invention, the above-discussed techniques, involving averaging and pro-rating to determine arrival times, may be combined. For example, such a combination may be accomplished by using an average of the arrival times for the N words on the N virtual lanes in determining the nominal time in block 604 of FIG. 6. In this case, the arrival time for the word on VL0 (virtual lane number 0) may be the average so determined. This may be expressed as: VL0 arrival time=Avg(VLs). The arrival time for the simultaneously transmitted word on VLn (virtual lane number n) may be the average so determined plus a pro-rated portion of T. This may be expressed as: VLn arrival time=n T/N.

Time-Stamping Using Subset of Lanes

The above discussion provides techniques for improved time-stamping for a multi-lane link with skew and for lane-differentiated time-stamping for simultaneously-arriving data. Such techniques result in time stamping with improved consistency and high accuracy.

However, in practice, simplicity may be more important than the last nanosecond of time accuracy. Hence, this section discloses simplifications that may be made to the methods and apparatus while still retaining a sufficiently high level of time accuracy for practical implementations.

Our analysis of exemplary implementations of 40 GE and 100 GE links indicates that the lane-to-lane skew is, in practice, substantially less than the 160 ns skew budget discussed above in relation to FIG. 1D. Rather, the expected worst case is only 44.6 ns of skew, where 42 ns is from random skew. This expected worst case would be realized only if every skew point caused the maximum expected skew and all of the maximums affected the same virtual lane.

Hence, as an alternative to averaging all virtual lanes of a multi-lane link, it may be advantageous to average over only a subset of the virtual lanes. The table in FIG. 7 shows results from a simulation implementing a 100 GE link with twenty (20) virtual lanes. The simulation assumed that the variation from nominal delay was uniform, that the skew contribution at each skew point is as shown in the expected maximum skew in FIG. 1D, and that the skew points do not correlate with each other regarding skew amounts.

The simulation ran 50,000 trials. The error in the table is defined as the absolute value of the computed skew minus the expected skew. The expected skew is the skew expected if the averaging is performed over all twenty (20) virtual lanes.

The first row in the table of FIG. 7 shows the typical arrival time error that would occur if the arrival time were determined from the word arrival time at a single arbitrary virtual lane. Note that on a packet-by-packet basis, due to the assumptions made, choosing a single arbitrary lane such as VL0 will have the same expected error as choosing the virtual lane that a given SOP happens to arrive on. The first row shows that the $50^{th}$ percentile error (i.e. the error level which would be above the error in 50% of the trials) is 4.7 ns, while the $99^{th}$ percentile error (i.e. the error level which would be above the error in 99% of the trials) is 15.9 ns.

The second row shows the typical arrival time error that would occur if the arrival time were determined from the word arrival time at two (2) arbitrary virtual lanes. The second row shows that the $50^{th}$ percentile error is reduced to 3.2 ns, while the $99^{th}$ percentile error is reduced to 11.5 ns.

The third row shows the typical arrival time error that would occur if the arrival time were determined from the word arrival time at five (5) arbitrary virtual lanes. The third row shows that the $50^{th}$ percentile error is further reduced to 1.8 ns, while the $99^{th}$ percentile error is further reduced to 6.7 ns.

The fourth row shows the typical arrival time error that would occur if the arrival time were determined from the word arrival time at ten (10) arbitrary virtual lanes. The fourth row shows that the $50^{th}$ percentile error is further reduced to 1.0 ns, while the $99^{th}$ percentile error is further reduced to 3.9 ns.

The fifth row shows the typical arrival time error that would occur if the arrival time were determined from the word arrival time at all twenty (20) arbitrary virtual lanes. Because of the definition used for the error, there is no error if the averaging is over all lanes.

Figure 8:
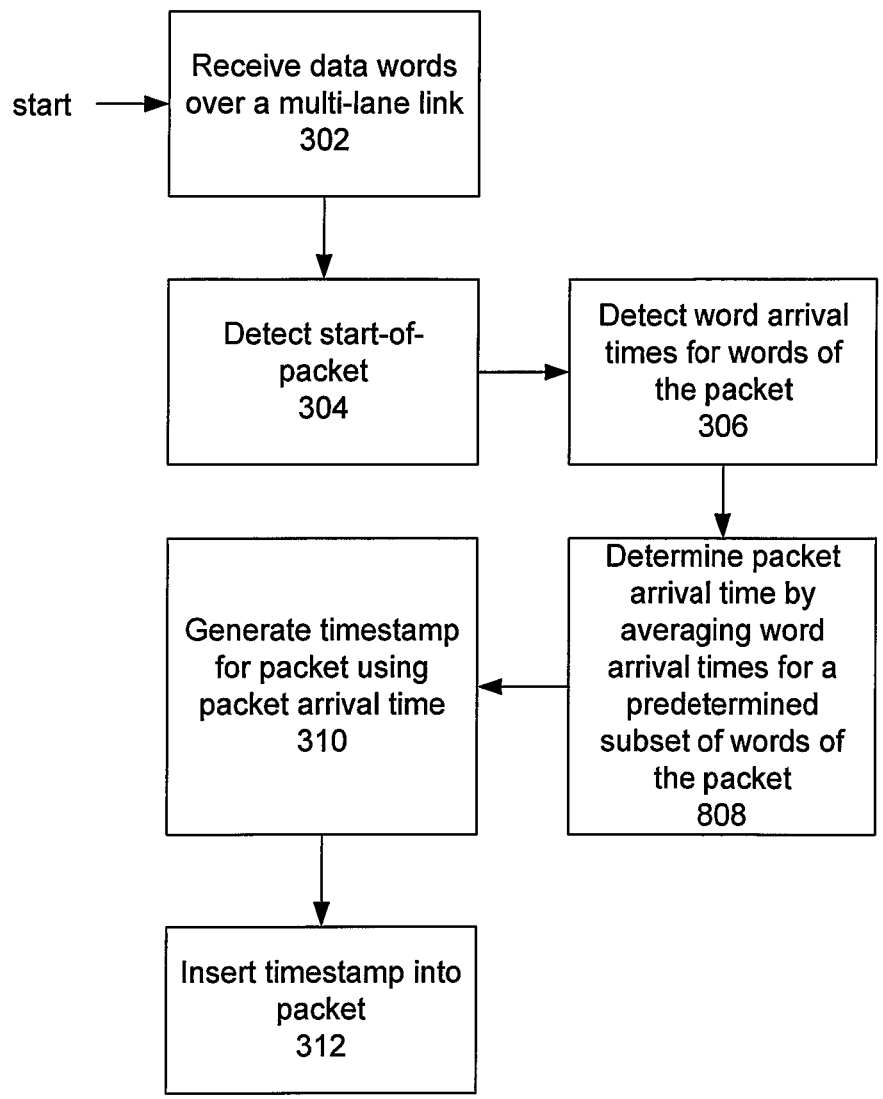
FIG. 8 is a flow chart of an exemplary method of time-stamping a data packet by averaging word arrival times for a predetermined subset of words of the packet in accordance with an embodiment of the invention.

FIG. 8 is a flow chart of an exemplary method 800 of time-stamping a data packet by averaging word arrival times for a predetermined subset of words of the packet in accordance with an embodiment of the invention. The method 800 of FIG. 8 is similar to the method 300 of FIG. 3. However, the method 800 of FIG. 8 specifies in block 808 that the packet arrival time is computed by averaging word arrival times for a predetermined subset of words of the packet.

Figure 9:
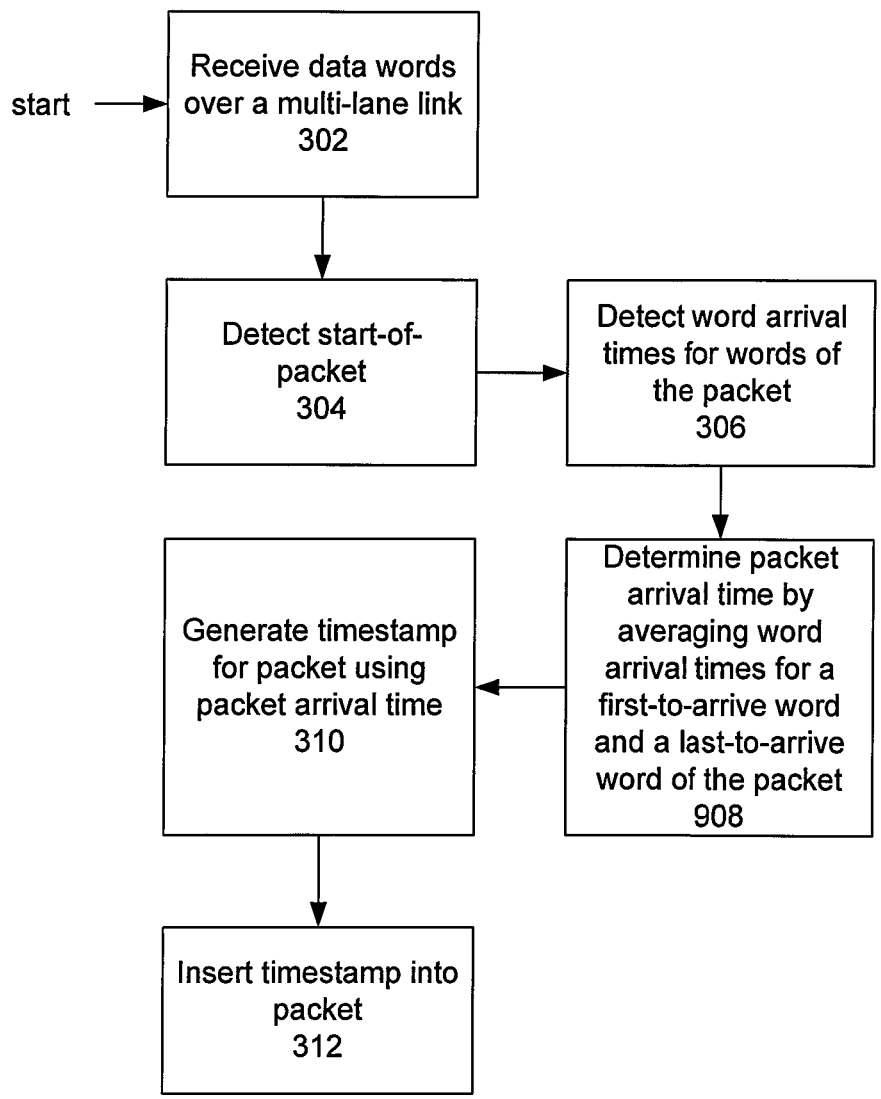
FIG. 9 is a flow chart of an exemplary method of time-stamping a data packet by averaging word arrival times for the first and last to arrive words of the packet in accordance with an embodiment of the invention.

FIG. 9 is a flow chart of an exemplary method 900 of time-stamping a data packet by averaging word arrival times for the first-to-arrive and last-to-arrive words of the packet in accordance with an embodiment of the invention. The method 900 of FIG. 9 is also similar to the method 300 of FIG. 3. However, the method 900 of FIG. 9 specifies in block 908 that the packet arrival time is computed by averaging word arrival times for the first-to-arrive and last-to-arrive words of the packet.

Average-Fullness Measures

In accordance with an embodiment of the invention, the arrival times for words on a lane may be determined indirectly without calculating the average of individual arrival times. In particular, as described below in relation to FIGS. 10 and 11, the average fullness of a FIFO buffer may be used to determine the average arrival time of words on a particular lane.

Figure 10:
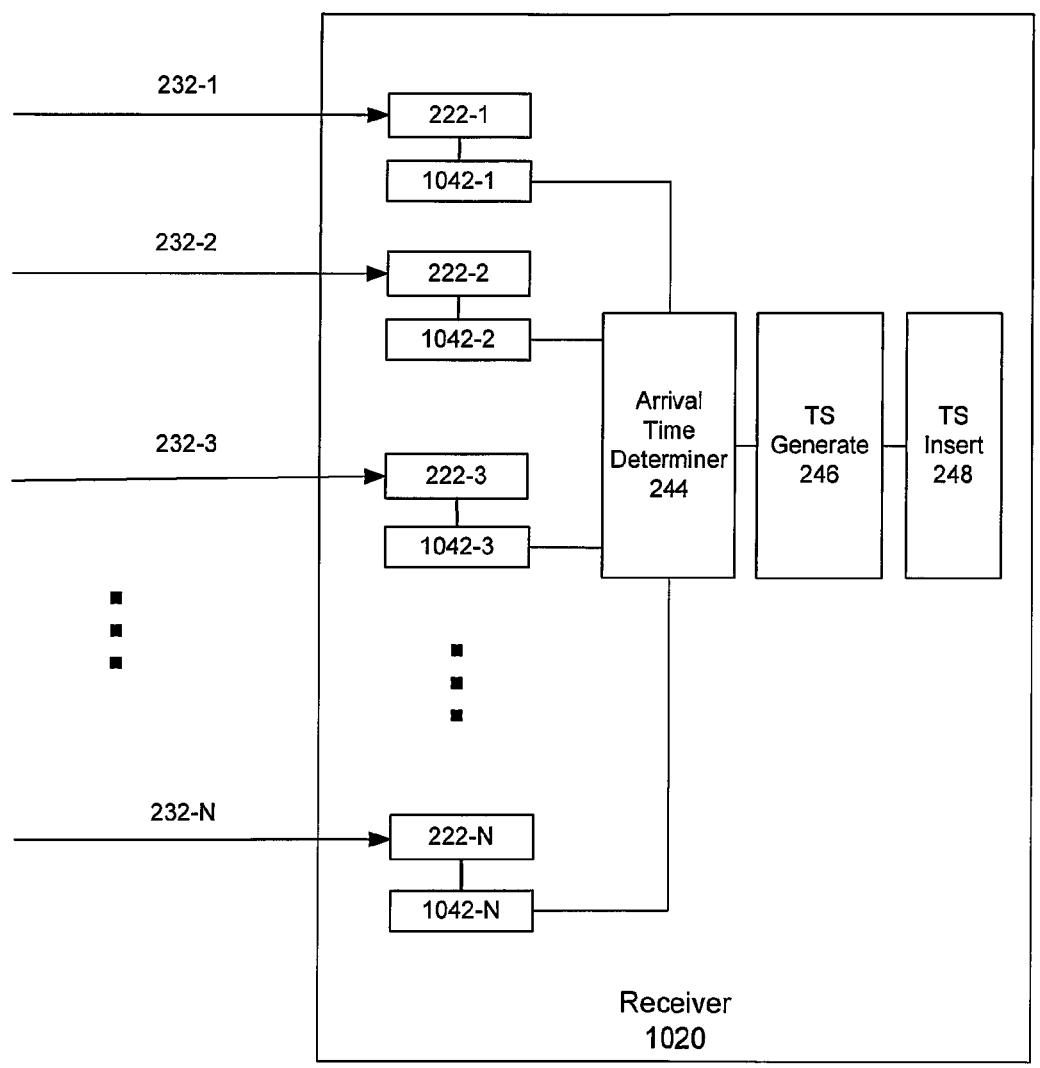
FIG. 10 is a block diagram of an exemplary circuit apparatus for determining an arrival time of a data packet received on a multi-lane link using average fullness of FIFO buffers in accordance with an embodiment of the invention.

FIG. 10 is a block diagram of an exemplary circuit apparatus for determining an arrival time of a data packet received on a multi-lane link using average fullness of FIFO buffers in accordance with an embodiment of the invention. The receiver 1020 of FIG. 10 is similar to the receiver 220 of FIG. 2. However, instead of the lane arrival detector circuits 242-1 through 242-N of FIG. 2, the receiver 1020 of FIG. 10 includes average fullness detector circuits 1042-1 through 1042-N.

The average fullness detector circuits 1042-1 through 1042-N determine an average fullness measure of a corresponding FIFO buffer 222-1 through 222-N. In one embodiment, each average fullness detector circuits 1042-n may be configured to implement the method 1100 described below in relation to FIG. 11.

The arrival time determiner circuit 244 may be electrically coupled to the average fullness detector circuits 1042-1 through 1042-N. The arrival time determiner circuit 244 may be arranged or configured to determine an arrival time for a data packet received over the N-lane link (the packet arrival time) using the average fullness data.

Figure 11:
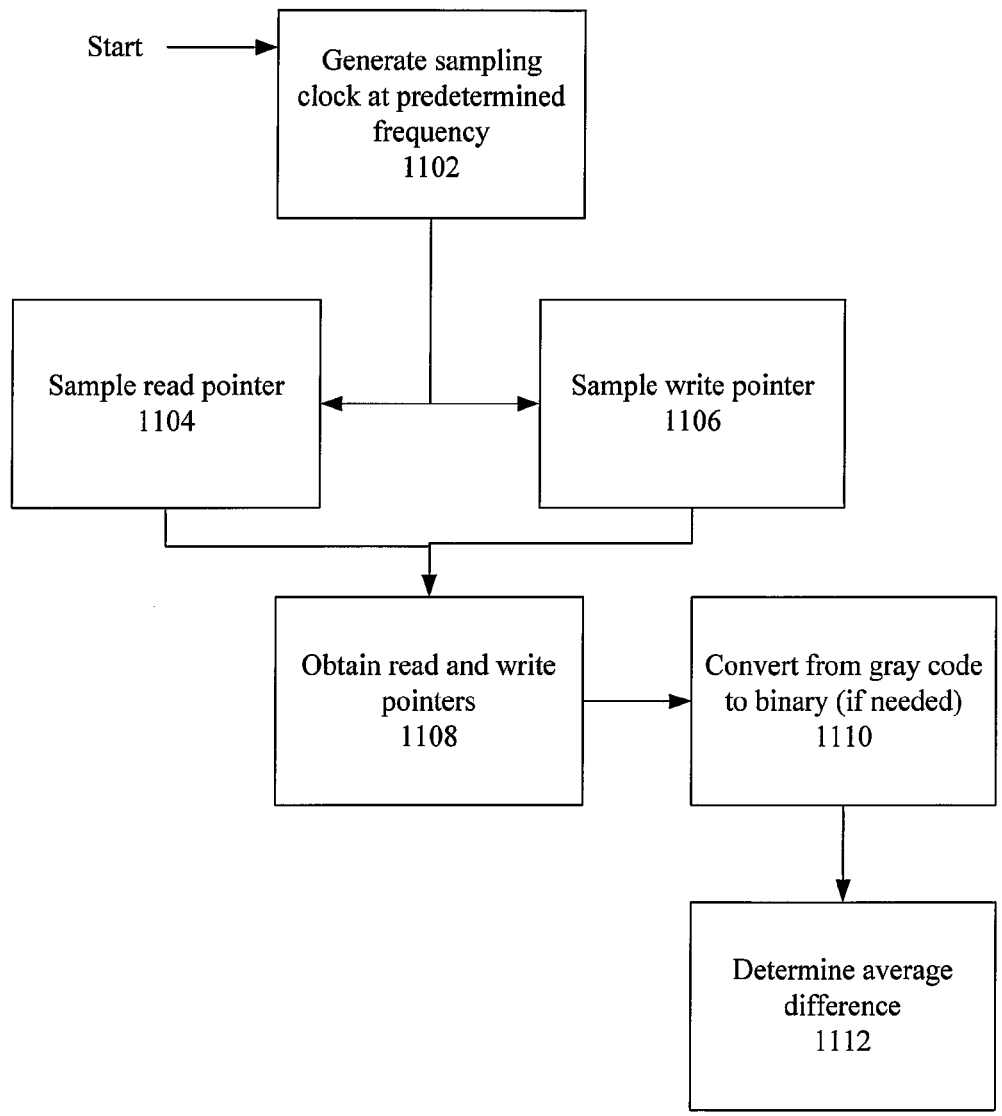
FIG. 11 is a flow chart of an exemplary method for determining an average fullness of a FIFO buffer in accordance with an embodiment of the invention.

FIG. 11 is a flow chart of an exemplary method 1100 for determining an average fullness of a FIFO buffer in accordance with an embodiment of the invention. Per block 1102, a sampling clock may be generated at a predetermined frequency. The read pointer is sampled per block 1104, and the write pointer is sampled per block 1106. The sampling clock is used so that the read and write pointers are sampled at a same time. This sampling may be performed for multiple clock cycles of the sampling clock so as to obtain a large number of samples of the read and write pointers.

The sampled read and write pointers are obtained per block 1108. If the read and write pointers are in gray code, then they may be subsequently converted, if needed, from gray code to binary in block 1110.

Per block 1112, an average difference between the sampled read and write pointers may be determined. The averaging may be performed over a sufficiently large number of samples so as to achieve convergence of the average difference value. This average difference indicates the average fullness of the FIFO buffer.

In accordance with embodiments of the invention, the average fullness of the FIFO buffer for a lane determined as described above may be used to determine an average arrival time for words on the lane. For example, the average fullness of the FIFO buffer for a lane may be used to determine the nominal arrival time in block 604 in FIG. 6.

Figure 12:
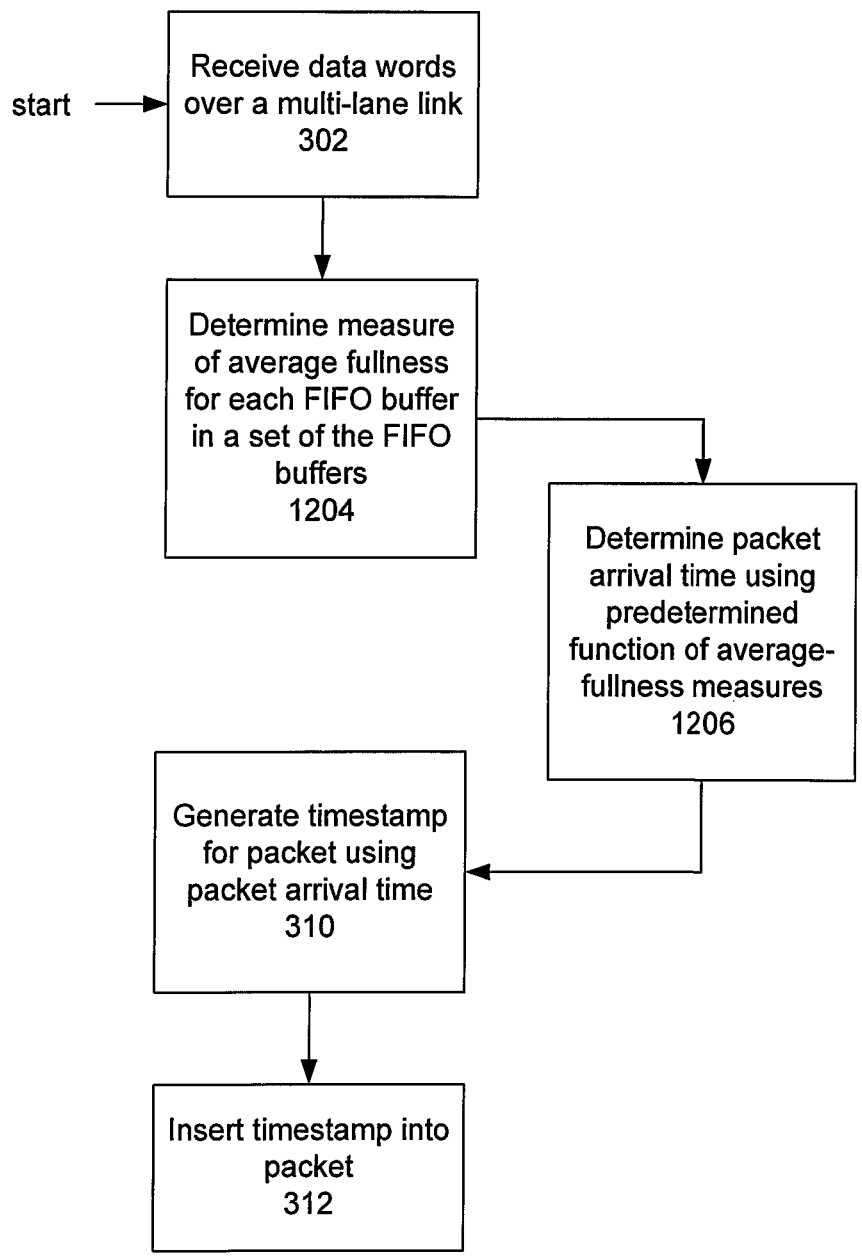
FIG. 12 is a flow chart of an exemplary method of time-stamping a data packet using average-fullness measures in accordance with an embodiment of the invention.

FIG. 12 is a flow chart of an exemplary method 1200 of time-stamping a data packet using average-fullness measures in accordance with an embodiment of the invention. The average-fullness measures relate to the average fullness of FIFO buffers used in a multi-lane link, each FIFO buffer being used to receive data words for a physical lane of the link. The method 1200 of FIG. 12 is similar to the method 300 of FIG. 3. However, blocks 304 through 308 in FIG. 3 is replaced with blocks 1204 and 1206 in FIG. 12.

Per block 1204, a determination is made of a measure of the average fullness for each FIFO buffer in set of the FIFO buffers. In one embodiment, the set of the FIFO buffers may the FIFO buffers for all the lanes. In another embodiment, the set of the FIFO buffers may include the FIFO buffers for only a subset of the lanes.

Per block 1206, a determination may be made of a packet arrival time using a predetermined function of the average-fullness measures. In one embodiment, the packet arrival time may be determined using an average of the average-fullness measures. In another embodiment, the packet arrival time may be determined using an average of the average-fullness measures plus an adjustment time such as discussed above in relation to block 606 of FIG. 6.

FPGA Implementation

Figure 13:
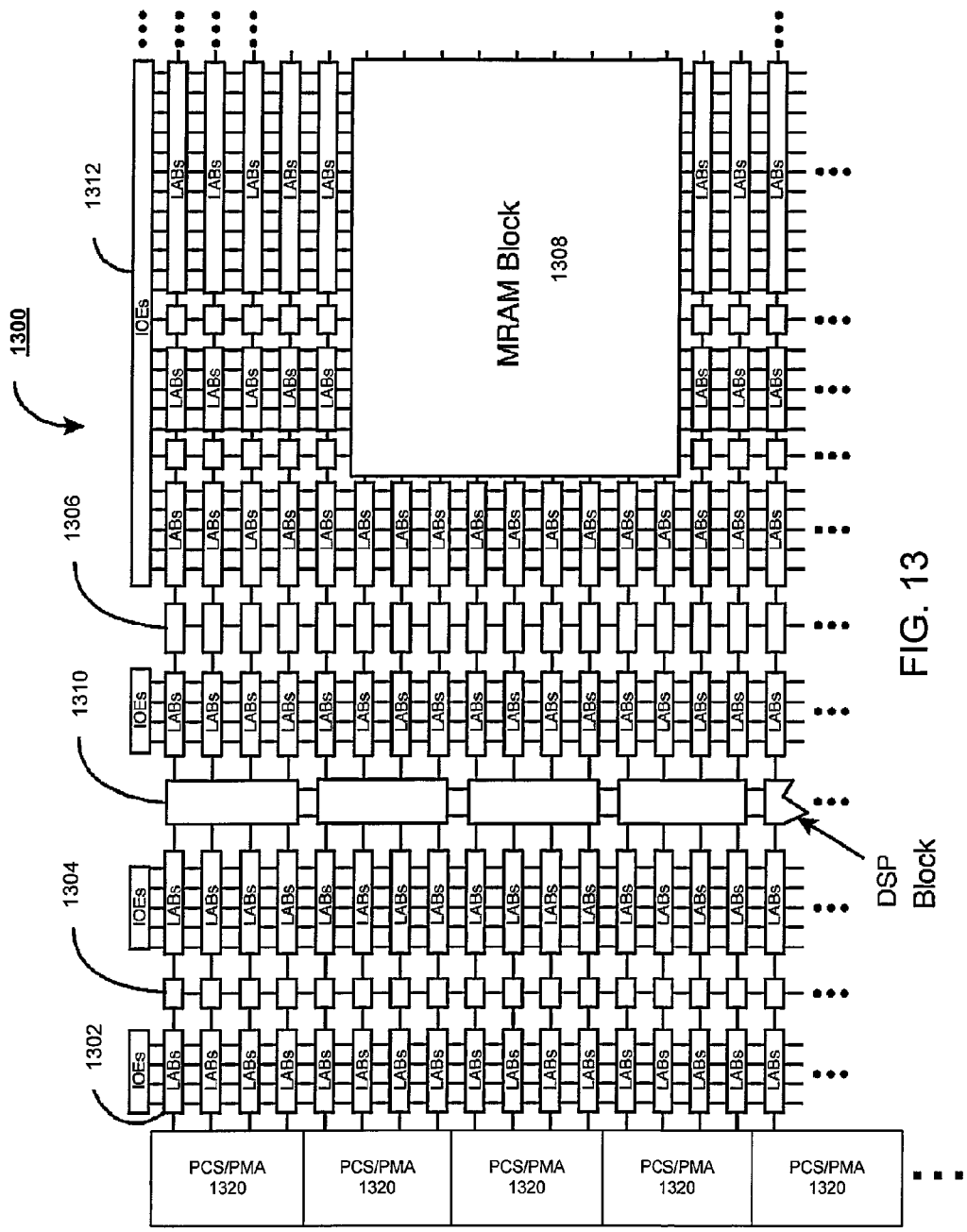
FIG. 13 is a simplified partial block diagram of a field programmable gate array (FPGA) that may be configured to implement an embodiment of the present invention.

FIG. 13 is a simplified partial block diagram of a field programmable gate array (FPGA) 1300 that may be configured with circuitry to implement an embodiment of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 1300 includes within its "core" a two-dimensional array of programmable logic array blocks (or LABs) 1302 that are interconnected by a network of column and row interconnect conductors of varying length and speed. LABs 1302 include multiple logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 1300 may also include a distributed memory structure including random access memory (RAM) blocks of varying sizes provided throughout the array. The RAM blocks include, for example, blocks 1304, blocks 1306, and block 1308. These memory blocks can also include shift registers and FIFO buffers.

FPGA 1300 may further include digital signal processing (DSP) blocks 1310 that can implement, for example, multipliers with add or subtract features. Input/output elements (IOEs) 1312 located, in this example, around the periphery of the chip support numerous single-ended and differential input/output standards. Each IOE 1312 is coupled to an external terminal (i.e., a pin) of FPGA 1300.

An array of PMA and PCS circuitry 1320 may be included as shown, for example. The PCS circuitry generally provides digital logic functions which implement data communication protocols, while the PMA circuitry generally provides mixed (analog/digital) signal functionality for the data communications. For example, for certain protocols, the PCS circuitry may be configured to perform, among other functions, 8 bit-to-10 bit and/or 128 bit-to-130 bit encoding for data to be sent to the PMA circuitry and 10 bit-to-8 bit and/or 130 bit-to-128 bit decoding for data received from the PMA circuitry. The PMA circuitry may be configured to perform, among other functions, serialization of data to be transmitted (conversion from parallel to serial) and de-serialization of received data (conversion from serial to parallel).

A subset of the LABs 1302 coupled to modules in the PMA/PCS array 1320 may be configured to implement the methods and apparatus described above. Alternatively, the above-described methods and apparatus may be implemented using hardwired circuitry, or part configured LABs 1302 and part hardwired circuitry.

It is to be understood that FPGA 1300 is described herein for illustrative purposes only and that the present invention can be implemented in many different types of PLDs, FPGAs, and ASICs.

Figure 14:
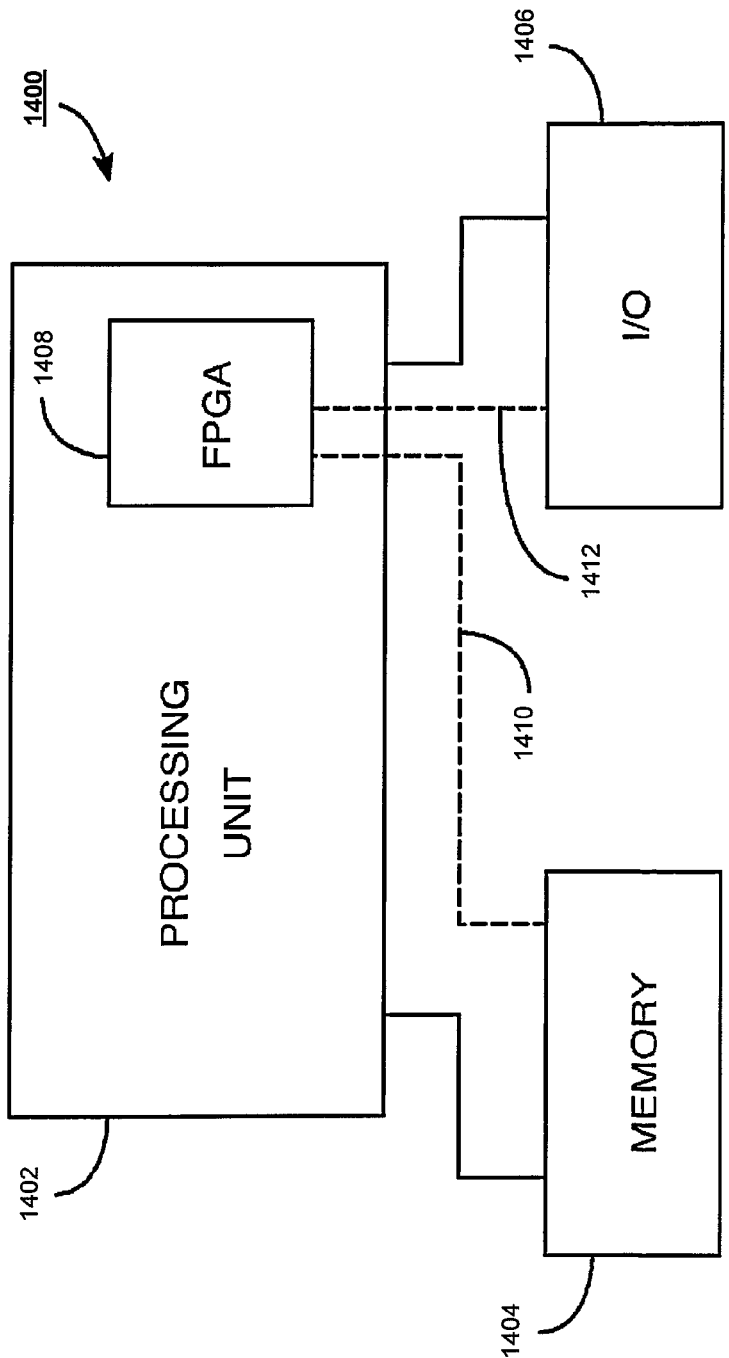
FIG. 14 shows a block diagram of an exemplary digital system that may be configured to utilize an embodiment of the present invention.

The present invention can also be implemented in a system that has a FPGA as one of several components. FIG. 14 shows a block diagram of an exemplary digital system 1400 that can embody techniques of the present invention. System 1400 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 1400 may be provided on a single board, on multiple boards, or within multiple enclosures.

System 1400 includes a processing unit 1402, a memory unit 1404, and an input/output (I/O) unit 1406 interconnected together by one or more buses. According to this exemplary embodiment, FPGA 1408 is embedded in processing unit 1402. FPGA 1408 can serve many different purposes within the system 1400. FPGA 1408 can, for example, be a logical building block of processing unit 1402, supporting its internal and external operations. FPGA 1408 is programmed to implement the logical functions necessary to carry on its particular role in system operation. FPGA 1408 can be specially coupled to memory 1404 through connection 1410 and to I/O unit 1406 through connection 1412.

Processing unit 1402 may direct data to an appropriate system component for processing or storage, execute a program stored in memory 1404, receive and transmit data via I/O unit 1406, or other similar function. Processing unit 1402 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 1408 may control the logical operations of the system. As another example, FPGA 1408 acts as a reconfigurable processor that may be reprogrammed as needed to handle a particular computing task. Alternately, FPGA 1408 may itself include an embedded microprocessor. Memory unit 1404 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of determining an arrival time of a data packet which has data striped across a plurality of lanes of a multi-lane link, the method comprising:
   receiving words of the data packet on the plurality of lanes of the multi-lane link;
   determining word arrival times for a subset of the words of the data packet, each word arrival time corresponding to an arrival time of a word of the data packet at an individual lane of the multi-lane link; and
   determining the arrival time of the data packet using the word arrival times for the subset of the words, wherein the subset of the words consists of a first-to-arrive word and a last-to-arrive word.

2. The method of claim 1 further comprising:
   determining a midpoint between the word arrival times for the first-to-arrive and last-to-arrive words.

3. The method of claim 1, wherein the subset of the words comprises half or less of the words of the data packet.

4. A method of determining an arrival time of a data packet which has data striped across a plurality of lanes of a multi-lane link, the method comprising:
   receiving words of the data packet on the plurality of lanes of the multi-lane link;
   determining word arrival times for a subset of the words of the data packet, wherein the subset of the words consists of words arriving on a single fixed lane of the multi-lane link, and wherein each word arrival time corresponds to an arrival time of a word of the data packet at the single fixed lane; and
   determining the arrival time of the data packet using the word arrival times for the subset of the words.

5. A receiver circuit that determines an arrival time of a data packet which has data striped across a plurality of lanes of a multi-lane link, the receiver circuit comprising:
   a plurality of receiver channel circuits for receiving words of the data packet on the plurality of lanes of the multi-lane link; and
   a receiver controller comprising
   arrival detector circuits coupled to the receiver channel circuits for determining word arrival times for a subset of the words of the data packet, each word arrival time corresponding to an arrival time of a word of the data packet at an individual lane of the multi-lane link, and
   logic circuitry coupled to the arrival detector circuits for determining the arrival time of the data packet using the word arrival times for the subset of the words, wherein the subset of the words consists of a first-to-arrive word and a last-to-arrive word.

6. The receiver circuit of claim 5, wherein the logic circuitry further determines a midpoint between the word arrival times for the first-to-arrive and last-to-arrive words.

7. The receiver circuit of claim 5, wherein the subset of the words comprises half or fewer of the words of the data packet.

8. A receiver circuit that determines an arrival time of a data packet which has data striped across a plurality of lanes of a multi-lane link, the receiver circuit comprising:
   a plurality of receiver channel circuits for receiving words of the data packet on the plurality of lanes of the multi-lane link; and
   a receiver controller comprising
   arrival detector circuits coupled to the receiver channel circuits for determining word arrival times for a subset of the words of the data packet, wherein the subset of the words consists of words arriving on a single fixed lane of the multi-lane link, and wherein each word arrival time corresponds to an arrival time of a word of the data packet at the single fixed lane, and
   logic circuitry coupled to the arrival detector circuits for determining the arrival time of the data packet using the word arrival times for the subset of the words.

9. A method of determining an arrival time of a data packet which has data striped across a plurality of lanes of a multi-lane link by an integrated circuit, the method comprising: receiving words of the data packet at first-in-first-out (FIFO) buffers, each said FIFO buffer buffering the words for one lane of the multi-lane link; determining an average fullness for a set of the FIFO buffers; and determining the arrival time of the data packet using the average fullness for the set of the FIFO buffers; wherein the average fullness of the FIFO buffer is determined using an average difference between sampled read and write pointers.

10. The method of claim 9, wherein the set of the FIFO buffers includes all the FIFO buffers that receive the words of the data packet.

11. The method of claim 9, wherein the set of the FIFO buffers includes a subset of the FIFO buffers that receive the words of the data packet.

12. The method of claim 9, wherein the set of the FIFO buffers consists of a single FIFO buffer.

13. The method of claim 9, further comprising:
   determining an average difference of read and write pointers of a FIFO buffer to determine the average fullness for the FIFO buffer.

14. A receiver circuit that determines an arrival time of a data packet which has data striped across a plurality of lanes of a multi-lane link, the receiver circuit comprising: a plurality of first-in-first-out (FIFO) buffers, each said FIFO buffer buffering the data for one lane of the multi-lane link; and a receiver controller comprising fullness detector circuit coupled to a set of the FIFO buffers, each fullness detector circuit determining an average fullness measures of one of the FIFO buffers in the set, and logic circuitry coupled to the fullness detector circuits for determining the arrival time of the data packet using the measure of the average fullness measure; wherein the average fullness of the FIFO buffer is determined using an average difference between sampled read and write pointers.

15. The receiver circuit of claim 14, wherein the set of the FIFO buffers includes all the FIFO buffers that receive the words of the data packet.

16. The receiver circuit of claim 14, wherein the set of the FIFO buffers includes a subset of the FIFO buffers that receive the words of the data packet.

17. The receiver circuit of claim 14, wherein the set of the FIFO buffers consists of a single FIFO buffer.

18. The receiver circuit of claim 14, wherein the fullness detector circuits determine an average difference of read and write pointers of a FIFO buffer to determine the average fullness measure for the FIFO buffer.

* * * * *